United States Patent
Yokokawa et al.

(10) Patent No.: US 7,010,203 B2
(45) Date of Patent: Mar. 7, 2006

(54) OPTICAL FIBER MANUFACTURING METHOD AND OPTICAL FIBER

(75) Inventors: Tomoyuki Yokokawa, Yokohama (JP); Eiji Yanada, Yokohama (JP); Masaaki Hirano, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 43 days.

(21) Appl. No.: 10/479,852

(22) PCT Filed: Apr. 3, 2003

(86) PCT No.: PCT/JP03/04267

§ 371 (c)(1),
(2), (4) Date: Dec. 8, 2003

(87) PCT Pub. No.: WO03/084889

PCT Pub. Date: Oct. 16, 2003

(65) Prior Publication Data

US 2004/0170365 A1    Sep. 2, 2004

(30) Foreign Application Priority Data

Apr. 8, 2002 (JP) .............................. 2002-105263

(51) Int. Cl.
*G02B 6/02* (2006.01)
*G02B 6/22* (2006.01)

(52) U.S. Cl. ...................... 385/127; 385/123; 385/124; 385/126; 385/128; 65/385; 65/406; 65/412; 65/427; 65/428; 65/430; 65/435

(58) Field of Classification Search ........ 385/123–128, 385/141, 142, 144
See application file for complete search history.

(56) References Cited

U.S. PATENT DOCUMENTS

2002/0001444 A1    1/2002    Hirano et al.

FOREIGN PATENT DOCUMENTS

EP    1061054 A1 * 12/2000

(Continued)

OTHER PUBLICATIONS

Bachmann et al. "Stress is Optical Waveguides: Preforms". Applied Optics, vol. 25, No. 7. Apr. $1^{st}$ 1986. pp 1093-1098.*
Ohashi et al. "Imperfection Loss Reduction in Viscosity-Matched Optical Fibers". IEEE Photonics Technology Letters, vol. 5, No. 7. Jul. 1993. pp 812-814.*
Ohashi et al. "Fluorine Concentration Dependence of Viscosity in F-Doped Silica Glass", Electronics Letters. vol. 28, No. 11, May $21^{st}$ 1992. pp 1008-1010.*

*Primary Examiner*—Brian Healy
*Assistant Examiner*—Derek L. Dupuis
(74) *Attorney, Agent, or Firm*—McDermott Will & Emery LLP (57) ABSTRACT

An object of the present invention is to provide an optical fiber manufacturing method and an optical fiber in which an increase in the transmission loss is suppressed by preventing hydroxyl group from entering near the core portion.

This invention provides a method for manufacturing an optical fiber 10 including forming a glass pipe 16 by applying a ring portion 15 on the inner face of a starting pipe 14 as a starting material, inserting a glass rod 13 that becomes a central core portion 11 and a depressed portion 12 into the inside of the glass pipe 16, integrating the glass pipe 16 and the glass rod 13 by collapse to form a glass body 17, forming a preform 10*a* by providing a jacket portion 18 outside the glass body 17, and drawing the preform 10*a*, wherein the thickness of the starting pipe 14 is set in a range from 4 mm to 8 mm.

16 Claims, 4 Drawing Sheets

FOREIGN PATENT DOCUMENTS

| | | |
|---|---|---|
| EP | 1170604 A2 | 1/2002 |
| JP | 62-167235 A | 7/1987 |
| JP | 2001-31438 A | 5/1990 |
| JP | 2002-82251 A | 11/1990 |
| JP | 2001-253726 A | 9/2001 |
| JP | 2001-337245 A | 12/2001 |

* cited by examiner

OPTICAL FIBER MANUFACTURING METHOD AND OPTICAL FIBER

TECHNICAL FIELD

The present invention relates to an optical fiber manufacturing method and an optical fiber, and more particularly to a method for manufacturing an optical fiber by inserting a glass rod into a glass pipe having a glass layer on the inside of a starting pipe, integrating them by collapse, providing a jacket portion on its outside to form a preform, and drawing the preform, and the optical fiber.

BACKGROUND ART

Figure 4A:
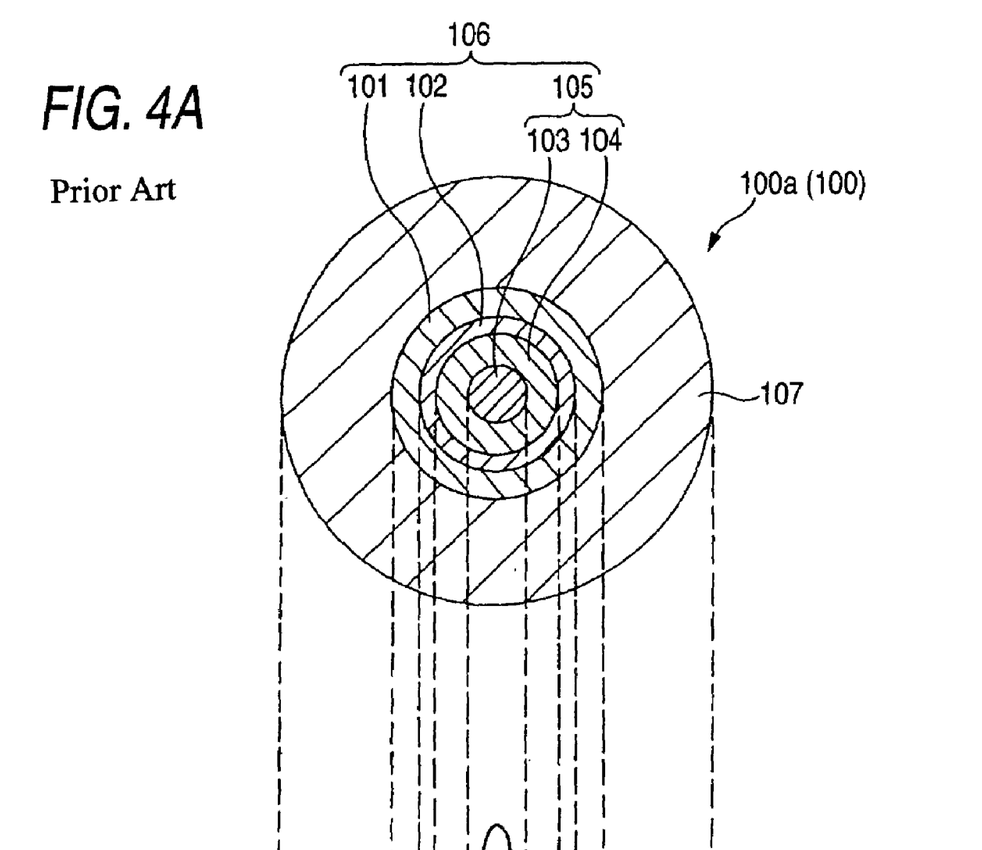
FIG. 4A is a cross-sectional view of the preform (or optical fiber)
Figure 4B:
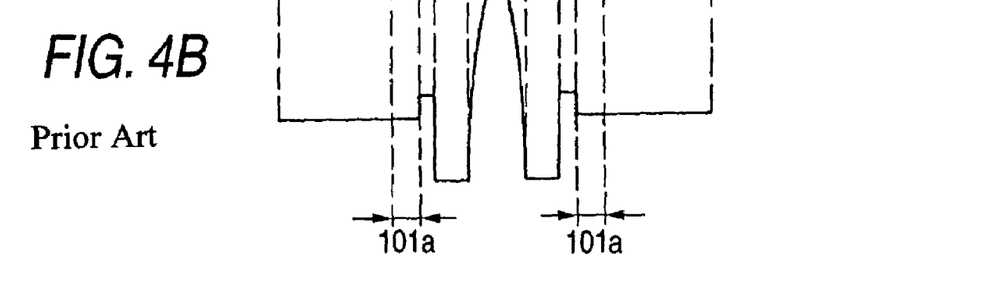
FIG. 4B is a view showing a refractive index distribution of the optical fiber.

A conventional method for manufacturing an optical fiber 100 as shown in FIG. 4 will be described below. FIG. 4A is a view showing the cross section of the conventional optical fiber 100 and FIG. 4B is a view showing a refractive index distribution of the optical fiber 100.

First of all, a ring portion 102 is formed by depositing glass particles on the inner face of a starting pipe 101 as a starting material by the MCVD method (Modified Chemical vapor Deposition Method, Internal CVD method). Then, a glass rod 105 having a core portion 103 and a depressed portion 104 is inserted into the ring portion 102 and integrated by rod-in collapse to fabricate a glass body 106. After a jacket portion 107 is sooted outside the glass body 106, a preform 100a is produced by vitrification. Thereafter, the preform 100a is heated and drawn to fabricate the optical fiber 100.

In the conventional manufacturing method as described above, the ring portion 102 is formed by the MCVD method, using the starting pipe 101 having a thickness 101a from 2 mm to 3 mm. In practicing the MCVD method, the starting pipe 101 is heated using an oxyhydrogen flame. Further, in the rod-in collapse and the process of sooting the jacket portion 107, the starting pipe 101 is also heated using an oxyhydrogen flame. Therefore, hydroxyl group contained in the oxyhydrogen flame enters the surface of the starting pipe 101. This hydroxyl group may intrude near the core portion 103, and when the preform 100a is the optical fiber 100, light is absorbed into the hydroxyl group, giving rise to a situation where the transmission loss is increased.

DISCLOSURE OF THE INVENTION

The present invention is achieved to solve the above-mentioned problems, and it is an object of the invention to provide an optical fiber manufacturing method and an optical fiber in which an increase in the transmission loss is suppressed by preventing hydroxyl group from entering near the core portion.

The present inventor has made minute researches to solve those problems, and found that one of the causes of hydroxyl group entering near the core portion lies in the thickness of the starting pipe, or the cross-sectional area ratio of the glass rod to the starting pipe In order to achieve the above object, this invention provides a method for manufacturing an optical fiber including forming a glass pipe by coating a glass layer on the inner face of a starting pipe as a starting material, inserting a glass rod that becomes a central core portion and a part of a clad portion into the inside of the glass pipe, integrating the glass pipe and the glass rod by collapse to form a glass body, forming a preform by providing a jacket portion outside the glass body, and drawing the preform, characterized in that the thickness of the starting pipe is set in a range from 4 mm to 8 mm.

With the above method for manufacturing the optical fiber, the thickness of the starting pipe is set in a range from 4 mm to 8 mm, though it was conventionally as thin as 2 mm to 3 mm. Thereby, the distance from the surface of the starting glass on which hydroxyl group enters to the core portion is made greater. Accordingly, intruding hydroxyl group is effectively prevented from getting near the core portion, and an increase in the transmission loss due to hydroxyl group is suppressed.

If the thickness of the starting pipe is below 4 mm, it is estimated that hydroxyl group gets near the core portion. Further, if the thickness of the starting pipe is beyond 8 mm, it is difficult to collapse the glass rod within the glass pipe. Further, if the thickness of the starting pipe is beyond 8 mm, it is difficult to attain a temperature high enough to vitrify glass particles deposited inside the starting pipe and apply the glass layer on the inside.

Further, in order to achieve the above object, the invention provides a method for manufacturing an optical fiber including forming a glass pipe by coating a glass layer on the inner face of a starting pipe as a starting material, inserting a glass rod that becomes a central core portion and a part of a clad portion into the inside of the glass pipe, integrating the glass pipe and the glass rod by collapse to form a glass body, forming a preform by providing a jacket portion outside the glass body, and drawing the preform, characterized in that the ratio S1/S2 of the cross-sectional area S1 of the glass rod to the cross-sectional area S2 of the starting pipe is set in a range from 0.03 to 0.30.

With the above method for manufacturing the optical fiber, the ratio S1/S2 of the cross-sectional area S1 of the glass rod to the cross-sectional area S2 of the starting pipe is set in a range from 0.03 to 0.30, which is smaller than conventionally. Thereby, the distance from the surface of the starting glass on which hydroxyl group enters to the core portion is made greater. Accordingly, intruding hydroxyl group is effectively prevented from getting near the core portion, and an increase in the transmission loss due to hydroxyl group is suppressed.

If the ratio S1/S2 is below 0.03, it is difficult to collapse the glass rod within the glass pipe. Further, if the ratio S1/S2 is beyond 0.30, it is estimated that hydroxyl group gets near the core portion.

With the method for manufacturing the optical fiber according to the invention, it is desirable that the softening temperature of the jacket portion is lower than the softening temperature of pure silica.

With the method for manufacturing the optical fiber as constituted above, the heating temperature for drawing the preform is decreased, whereby an increase in the transmission loss due to Rayleigh scattering is suppressed. In this invention, pure silica means silicon dioxide ($SiO_2$) having a chlorine concentration of 0.10 mol % or less, a fluorine concentration of 0.10 mol % or less, and a metal impurity content of 0.1 wtppb or less.

Further, with the method for manufacturing the optical fiber according to the invention, it is desirable that the jacket portion is made of silica glass having chlorine with a concentration from 0.1 mol % to 1.0 mol % added.

With the method for manufacturing the optical fiber as constituted above, it is possible to reduce the scattering by setting the chlorine concentration to the lower limit value or 0.1 mol % to make the A value as the Rayleigh scattering factor less than or equal to 2.0 $\mu m^4$ dB/km. Further, the strength of the fiber is prevented from decreasing due to excessive addition of chlorine by setting the A value to the upper limit value or 1.0 mol %, and the rupture frequency of the optical fiber in drawing is reduced.

Further, with the method for manufacturing the optical fiber according to the invention, it is desirable that the jacket portion is made of silica glass having fluorine with a concentration from 0.1 mol % to 1.0 mol % added.

With the method for manufacturing the optical fiber as constituted above, it is possible to reduce the scattering by setting the fluorine concentration to the lower limit value or 0.1 mol % to make the A value as the Rayleigh scattering factor less than or equal to 2.0 $\mu m^4$ dB/km. Further, the strength of the fiber is prevented from decreasing due to excessive addition of chlorine by setting the A value to the upper limit value or 1.0 mol %, and the rupture frequency of the optical fiber in drawing is reduced.

Further, with the method for manufacturing the optical fiber according to the invention, it is desirable that the drawing tension at the time of drawing is from 60 gf to 350 gf.

With the method for manufacturing the optical fiber as constituted above, it is possible to reduce the scattering by setting the drawing tension to the lower limit value or 60 gf to make the A value as the Rayleigh scattering factor less than or equal to 2.0 $\mu m^4$ dB/km. Further, by setting the drawing tension to the upper limit value or 350 gf, the drawing tension is prevented from being excessive to cause a rupture of the optical fiber in drawing.

Further, with the method for manufacturing the optical fiber according to the invention, it is desirable that the temperature of a heated portion of the preform at the time of drawing is from 1600° C. to 2200° C.

With the method for manufacturing the optical fiber as constituted above, it is possible to reduce the scattering by setting the temperature of drawing the preform to the upper limit value or 2200° C. to make the A value as the Rayleigh scattering factor less than or equal to 2.0 $\mu m^4$ dB/km. Further, a temperature sufficient to soften the preform is attained by setting the temperature to the lower limit value or 1600° C., whereby it is possible to prevent a rupture from being caused by drawing.

Further, in order to achieve the above object, the invention provides an optical fiber manufactured by the above method for manufacturing the optical fiber according to the invention.

In the optical fiber as manufactured in the above way, the thickness of the starting pipe is set in a range from 4 mm to 8 mm, though it was conventionally as thin as 2 mm to 3 mm, or the ratio of the cross-sectional area of the glass rod to the cross-sectional area of the starting pipe is set in a range from 0.03 to 0.30, which is smaller than conventionally. Thereby, the distance from the surface of the starting glass on which hydroxyl group enters to the core portion is made greater. Accordingly, intruding hydroxyl group is prevented from getting near the core portion, and an increase in the transmission loss due to hydroxyl group is suppressed.

Further, in the optical fiber according to the invention, it is desirable that the dispersion value at a wavelength of 1.55 $\mu m$ is from (−200) ps/km/nm to (+4) ps/km/nm.

With the optical fiber as constituted in the above way, the bending loss of the optical fiber is reduced below a desired value by setting the dispersion value at a wavelength of 1.55 $\mu m$ to the lower limit value or (−200) ps/km/nm. Further, a desired dispersion compensation amount is attained by setting the dispersion value to the upper limit value or (+4) ps/km/nm.

Further, in the optical fiber according to the invention, the dispersion value at a wavelength of 1.55 $\mu m$ may be from (−400) ps/km/nm to (+20) ps/km/nm, or the dispersion value at a wavelength of 1.55 $\mu m$ may be from (−500) ps/km/nm to (+20) ps/km/nm.

Further, in the optical fiber according to the invention, it is desirable that the dispersion slope at a wavelength of 1.55 $\mu m$ is from (−2) ps/km/nm$^2$ to (+0.02) ps/km/nm$^2$.

In the optical fiber as constituted in the above way, it is possible to compensate the existing transmission path having various dispersion slopes and dispersion values for the dispersion at 50% or more by limiting the range of dispersion slope.

Further, in the optical fiber according to the invention, the dispersion slope at a wavelength of 1.55 $\mu m$ may be from (−12) ps/km/nm$^2$ to (+0.05) ps/km/nm$^2$, or the dispersion slope at a wavelength of 1.55 $\mu m$ may be from (−15) ps/km/nm$^2$ to (+0.10) ps/km/nm$^2$.

Further, in the optical fiber according to the invention, it is desirable that the transmission loss at a wavelength of 1.55 $\mu m$ is from 0.2 dB/km to 0.5 dB/km.

In the optical fiber as constituted in the above way, the dispersion compensation amount is increased by limiting the transmission loss to be low.

Further, in the optical fiber according to the invention, it is desirable that an increased amount of the transmission loss at a wavelength of 1.38 $\mu$ is less than or equal to 0.4 dB/km.

In the optical fiber as constituted in the above way, if an increase in the transmission loss due to hydroxyl group is suppressed low, it is possible to utilize the short wavelength bands such as the C band from wavelength 1.53 $\mu m$ to 1.57 $\mu m$, the L band from wavelength 1.57 $\mu m$ to 1.62 $\mu m$, the E band from wavelength 1.40 $\mu m$ to 1.48 $\mu m$ and the S band from wavelength 1.48 $\mu m$ to 1.53 $\mu m$.

BRIEF DESCRIPTION OF THE DRAWINGS

FIG. 1 is a view showing a preform and an optical fiber fabricated by the method for manufacturing the optical fiber according to an embodiment of the present invention, in which

FIG. 4 is a view showing a preform and an optical fiber fabricated by the conventional method for manufacturing the optical fiber, in which

In the drawings, reference numeral 10 denotes the optical fiber, 10a denotes the preform, 11 denotes a central core, 12 denotes a depressed portion (first clad portion), 13 denotes a glass rod, 14 denotes a starting pipe, 15 denotes a ring portion (glass layer), 16 denotes a glass pipe, 17 denotes a glass body, and 18 denotes a jacket portion.

BEST MODE FOR CARRYING OUT THE INVENTION

Figure 1A:
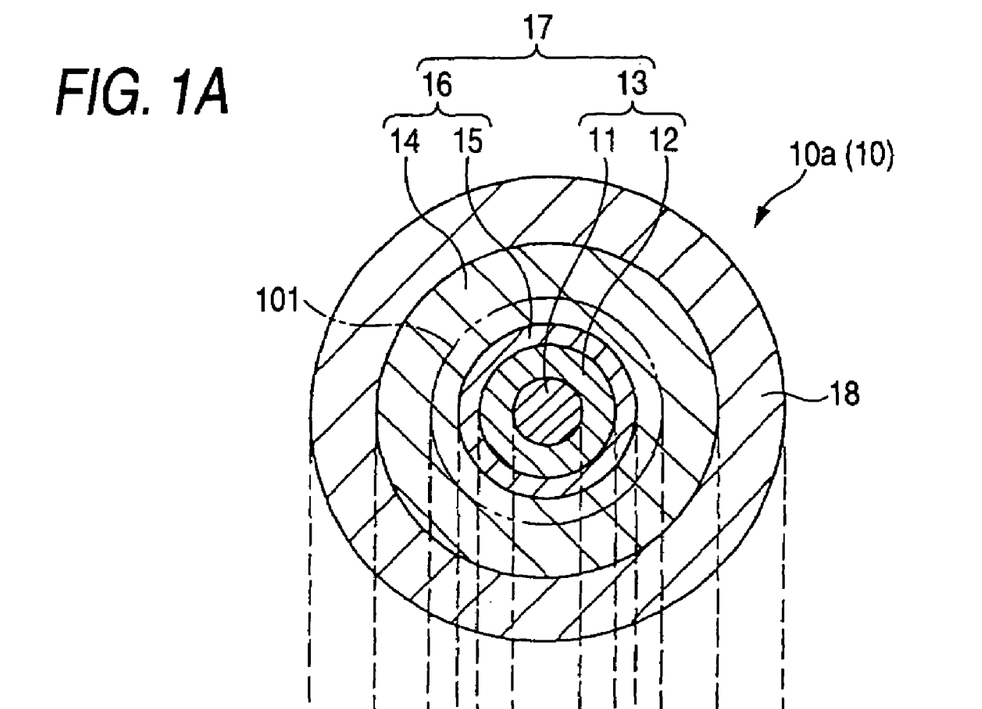
FIG. 1A is a cross-sectional view of the preform (or optical fiber)
Figure 1B:
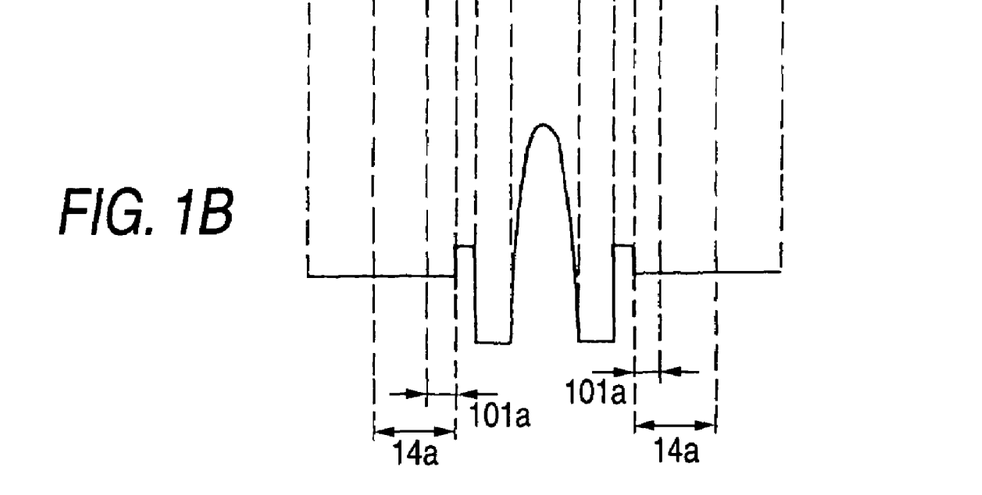
FIG. 1B is a view showing a refractive index distribution of the optical fiber.
Figure 2A:
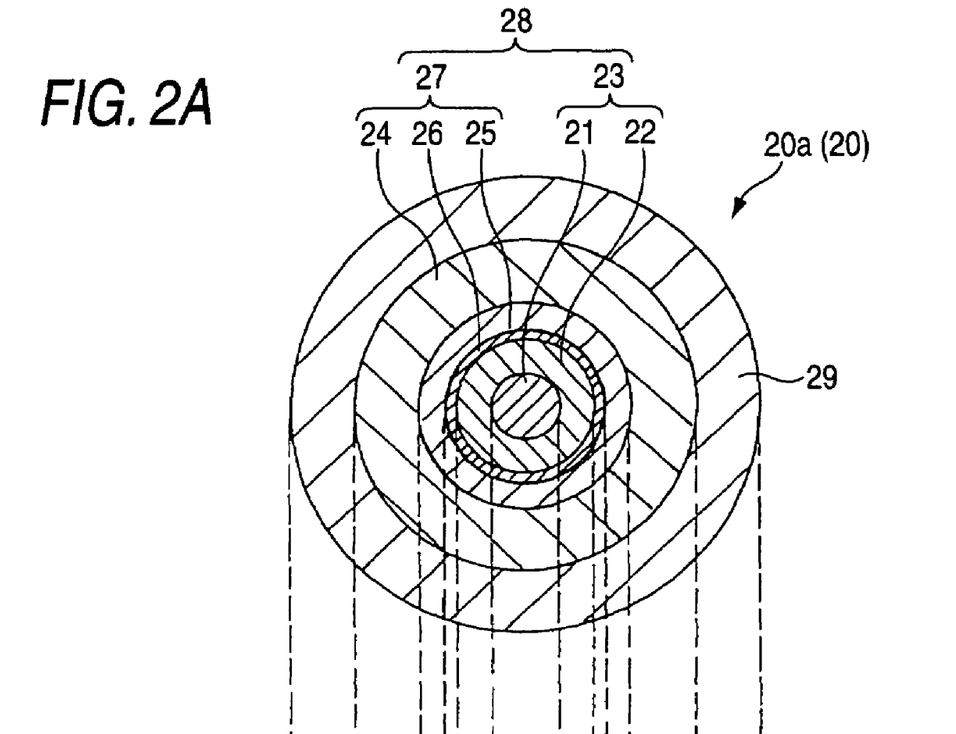
FIGS. 2A and 2B are views showing a variation example of the embodiment as shown in FIG. 1.
Figure 2B:
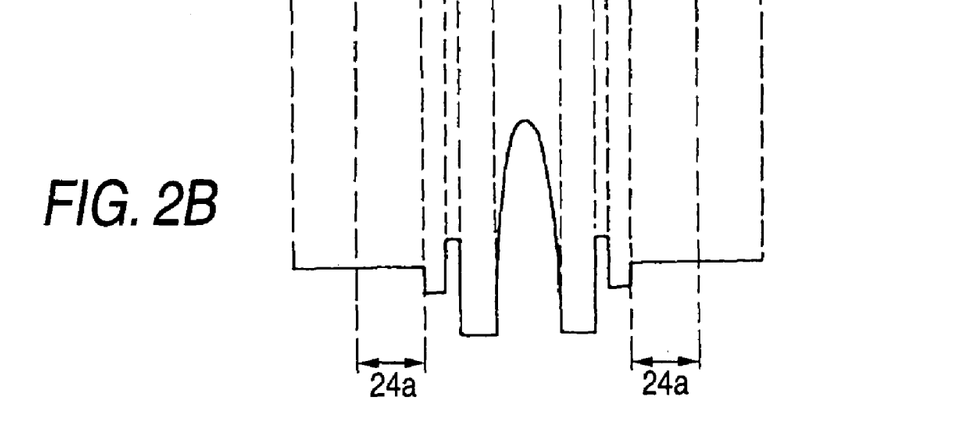

Referring now to FIGS. 1 and 2, an optical fiber manufacturing method and an optical fiber according to an embodiment of the present invention will be described below.

FIG. 1 is a view showing the optical fiber and a preform of the optical fiber according to the embodiment of the invention, in which FIG. 1A is a cross-sectional view of the preform (or optical fiber), and FIG. 1B is a view showing a refractive index distribution of the optical fiber. Further, FIG. 2 is a view showing a variation example of the embodiment as shown in FIG. 1.

As shown in FIG. 1, the preform 10a of the optical fiber 10 according to this embodiment has a central core portion 11 with a high refractive index in the center, and a depressed portion 12 as a first clad portion with a lower refractive index around the core portion. A ring portion 15 as a second clad portion with a slightly higher refractive index than pure silica is formed outside the depressed portion 12. Moreover, a starting pipe 14 composing a third clad portion and a jacket portion 18 are provided around the ring portion 15. The optical fiber 10 is obtained by drawing this preform 10a.

The present inventor has made acute researches to prevent hydroxyl group from entering near the central core portion 11 in producing the optical fiber 10, and found that the thickness 14a of the starting pipe 14 should be set in a range from 4 mm to 8 mm to suppress the transmission loss of optical fiber at a wavelength of 1.55 µm below a tolerance of 0.5 dB/km. Further, the inventor has found that the ratio S1/S2 of the sum S1 of the cross-sectional areas of the central core portion 11 and the depressed portion 12 to the cross-sectional area S2 of the starting pipe 14 should be set in a range from 0.03 to 0.30.

A method for manufacturing the optical fiber 10 as shown in FIG. 1 will be described below.

First of all, a glass layer serving as the ring portion 15 is applied on the inner face of the starting pipe 14 made of quartz glass as the starting material by the MCVD method, to produce a glass pipe 16. More particularly, the MCVD method involves supplying a source gas to the inside of the starting pipe 14, heating the starting pipe 14 from the outside by an oxyhydrogen burner while rotating the starting pipe 14, producing glass particles from the source gas and depositing them on the inside of the starting pipe 14. At this time, a plurality of glass layers are applied on the inside of the starting pipe to form the ring portion 15 by reciprocating the oxyhydrogen burner in the longitudinal direction of the starting pipe 14.

In this embodiment, the starting pipe 14 is a quartz pipe having a thickness of 4 mm to 8 mm. The thickness 14a of this starting pipe 14 is greater than the thickness 101a (2 mm to 3 mm) of the conventional starting pipe 101 as previously described. The source gas supplied to the inside of the starting pipe 14 to apply layers on the inside of the ring portion 15 maybe silicon tetrachloride ($SiCl_4$) or germanium tetrachloride ($GeCl_4$).

Then, the glass rod 13 having the central core portion 11 and the depressed portion 12 is inserted into the inside of the glass pipe 16, and integrated by rod-in collapse to form a glass body 17. More particularly, the rod-in collapse is made by heating the glass pipe 16 from the outside, employing the oxyhydrogen burner, while rotating the glass rod 13 and the glass pipe 16 in a state where the glass rod 13 is inserted into the inside of the glass pipe 16. Thereby, at least the glass pipe 16 contracts due to surface tension, so that the glass rod 13 is secured onto the inside of the glass pipe 16 without clearance.

The glass rod 13 has an outer diameter of 8 mm and comprises the central core portion 11 made of silica ($SiO_2$) with germanium (Ge) added and having a maximal specific refractive index difference of (+1.6) % and the depressed portion 12 made of silica ($SiO_2$) with fluorine (F) added and having a minimal specific refractive index difference of (−0.5) %. The specific refractive index difference as used herein means a difference in the refractive index of the central core portion 11 or the depressed portion 12 with respect to the refractive index of pure silica.

At this time, the ratio S1/S2 of the cross-sectional area S1 of the glass rod 13 composed of the central core portion 11 and the depressed portion 12 to the cross-sectional area S2 of the starting pipe 14 is set in a range from 0.03 to 0.30.

Then, the jacket portion 18 is provided outside the glass body 17 to form the preform 10a. The jacket portion 18 is obtained by combusting a source gas containing silicon tetrachloride and oxyhydrogen gas, employing a multi-pipe burner and depositing glass particles produced thereby on the outside of the glass body 17 (referred to as sooting).

At this time, the jacket portion 18 has desirably a softening temperature lower than the softening temperature of pure silica Further, the jacket portion 18 is desirably made of silica glass having chlorine with a concentration from 0.1 mol % to 1.0 mol % added. Or the jacket portion 18 may be made of silica glass having fluorine with a concentration from 0.1 mol % to 1.0 mol % added.

And the preform 10a is heated up to the temperature from 1600° C. to 2200° C., and drawn to fabricate the optical fiber 10. At this time, the drawing tension is desirably set in a range from 60 gf to 350 gf. By drawing the preform under the above set-up conditions, the A value that is a Rayleigh scattering factor is set to 2.0 $\mu m^4$ dB/km or less to suppress an increase in the transmission loss due to Rayleigh scattering.

With the optical fiber manufacturing method and the optical fiber 10 as described above, the thickness 14a of the starting pipe 14 is set in a range from 4 mm to 8 mm, or the ratio S1/S2 of the cross-sectional area S1 of the glass rod 13 to the cross-sectional area S2 of the starting pipe 14 is set in a range from 0.03 to 0.30, whereby the distance from the central core portion 11 to the surface of the starting pipe 14 is set to be larger than conventionally.

Accordingly, the hydroxyl group entering the surface of the starting pipe 14 is prevented from entering near the central core portion 11 when forming the glass pipe 16 by the MCVD method, forming the glass body 17 by rod-in collapse, and forming the jacket portion 18 by sooting. Hence, it is possible to suppress an increase in the transmission loss due to hydroxyl group.

With the optical fiber 10 as described above, since it is possible to suppress an increase in the transmission loss due to hydroxyl group, the transmission loss $\alpha 1$ at a wavelength of 1.55 µm is easily suppressed within a range $0.2 \leq \alpha 1 \leq 0.5$ dB/km. Further, an increased amount $\Delta \alpha 2$ in the transmission loss at a wavelength of 1.38 µm due to hydroxyl group is suppressed to 0.4 dB/km or less.

Herein, if the lower limit value of the dispersion value at a wavelength of 1.55 µm is set to (−200) ps/kn/nm, the bending loss of the optical fiber is suppressed below a desired value. Further, if the upper limit value of the dispersion value at a wavelength of 1.55 µm is set to (+4) ps/kn/nm, a desired dispersion compensation value is attained. Further, the optical fiber 10 may have the dispersion value at a wavelength of 1.55 µm in a range from (−400) ps/km/nm to (+20) ps/km/nm, or the dispersion value at a wavelength of 1.55 µm in a range from (−500) ps/km/nm to (+20) ps/km/nm.

Further, if the dispersion slope at a wavelength of 1.55 µm is limited in a range from (−2) ps/km/$nm^2$ to (+0.02) ps/km/$nm^2$, the dispersion of the existing transmission path having various dispersion slopes and dispersion values is highly compensated at 50% or more. Further, the optical fiber 10 may have the dispersion slope at a wavelength of 1.55 μin a range from (−12) ps/km/nm² to (+0.05) ps/km/nm², or from (−15) ps/km/nm² to (+0.10) ps/km/nm².

Thereby, the optical fiber 10 may be employed as a dispersion compensating optical fiber (DCF) for compensating for the dispersion of non-zero dispersion shift fiber (NZ-DSF).

Further, for the optical fiber 10, the ratio S3/S4 of the sum S3 of cross-sectional areas of the central core portion 11 and the depressed portion 12 composing the glass rod 13 in the preform before drawing to the cross-sectional area S4 of the portion that is the starting pipe 14 in the preform before drawing is desirably from 0.03 to 0.30.

The cross-sectional area S3 of the glass rod 13 in the preform is specified by measuring the refractive index distribution with an RNFP (Refracted Near Field Pattern) or measuring a radial distribution of germanium by an EPMA (Electron Probe Micro Analyzer). Further, the cross-sectional area S4 of the starting pipe 14 in the preform is specified by observing an interface between the starting pipe 14 and the jacket portion 18 as a step difference by etching the cross section of the optical fiber 10.

Further, the optical fiber manufacturing method and the optical fiber according to this invention is applicable the optical fiber having a structure of four-fold clad and the manufacturing method of this optical fiber, as shown in FIG. 2.

A method for manufacturing the optical fiber 20 as shown in FIG. 2 will be described below.

First of all, a glass layer serving as a second depressed portion 25 and a glass layer serving as a ring portion 26 are applied on the inner face of a starting pipe 24 by the MCVD method, and made a glass pipe 27. Herein, the starting pipe 24 has a thickness 24a of 4 mm to 8 mm, like the starting pipe 14 as previously described.

Then, a glass rod 23 having a central core portion 21 and a first depressed portion 22 is inserted into the inside of the glass pipe 27, and integrated by rod-in collapse to form a glass body 28.

Then, a jacket portion 29 is provided outside the glass body 28 to form a preform 20a.

The optical fiber 20 is produced by drawing the preform 20a.

At this time, the cross-sectional are of the glass rod 23 corresponds to the cross-sectional area S1, and the cross-sectional area of the starting pipe 24 corresponds to the cross-sectional area S2. Accordingly, the distance from the central core portion 21 to the surface of the starting pipe 24 is set to be larger than conventionally.

FIRST EXAMPLE

A first example of the optical fiber manufacturing method and the optical fiber according to the invention will be described below.

Seven kinds of optical fibers are produced by setting the thickness of the starting pipe 14 as shown in FIG. 1 in a range from 2 mm to 8 mm at every 1 mm in accordance with the above embodiments. For these optical fibers, the transmission loss at a wavelength of 1.55 μm is measured and evaluated by comparison.

The method for manufacturing the optical fiber in the first example will be described below.

First of all, the ring portion 15 as the glass layer is applied on the inner face of the starting pipe 14 by the MCVD method to form the glass pipe 16. At this time, the starting pipe 14 had an inner diameter of 28 mm and a thickness of 2 mm to 8 mm and is made of quartz glass. That is, the outer diameter of the starting pipe 14 is changed from 30 mm to 36 mm with increased thickness. The gases supplied to the ring portion 15 applied on the inside of the starting pipe 14 included silicon tetrachloride, germanium tetrachloride and oxygen. The supply amounts of gases are 200 sccm (standard cm³/min) for $SiCl_4$, 45 sccm for $GeCl_4$ and 2500 sccm for $O_2$. The heating temperature of oxyhydrogen flame for heating the starting pipe 14 is set at 1600° C., and ten layers of glass particles are deposited. Thereby, the ring portion 15 having the maximal specific refractive index difference of (+0.3) % is formed.

Then, the glass rod 13 having the central core portion 11 and the depressed portion 12 as the first clad portion is inserted into the inside of the glass pipe 16, and integrated by collapse to form the glass body 17. The central core portion 11 is made of silica with germanium added and had a maximal specific refractive index difference of (+1.6) % with respect to pure silica. The depressed portion 12 is made of silica with fluorine added and had a minimal specific refractive index difference of (−0.5) % with respect to pure silica. The outer diameter of the glass rod 13 is 8 mm.

Then, the jacket portion 18 with an outer diameter of 46 mm is sooted on the outside of the glass body 17, employing an oxyhydrogen multi-pipe burner, to form the preform 10a.

The preform 10a is heated up to a temperature of 1800° C. and drawn, and covered with ultraviolet curable resin to fabricate the optical fiber 10 having an outer diameter of 185 mm. At this time, the drawing tension is set to 200 gf.

For seven kinds of optical fibers produced in the above way, the transmission loss at a wavelength of 1.55 μm is measured. The measurement results are shown in FIG. 3.

Figure 3:
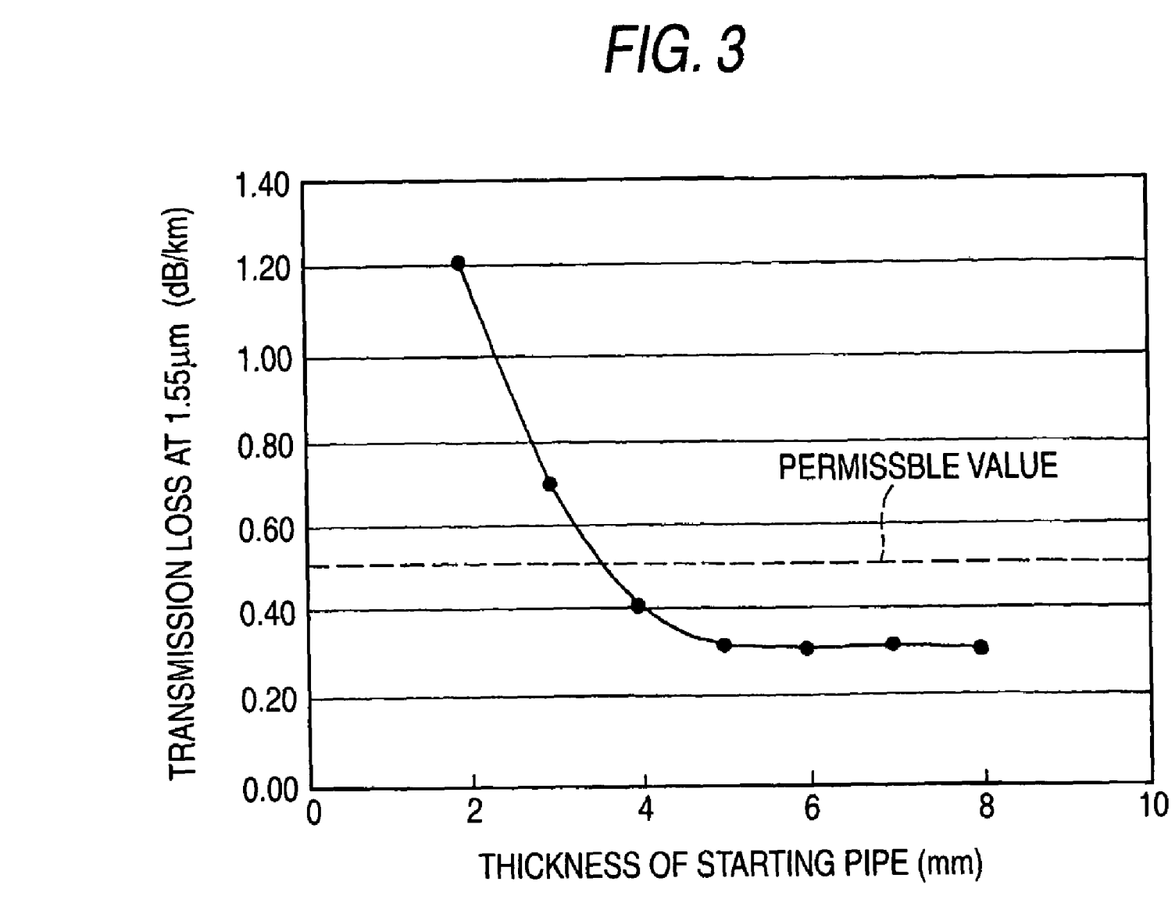
FIG. 3 is a graph representing the relation between the thickness of a glass pipe and the transmission loss at a wavelength of 1.55 $\mu m$.

As shown in FIG. 3, for the optical fibers in which the starting pipe had the thickness of 2 mm and 3 mm, the transmission loss is beyond a tolerance of 0.5 dB/km. On the contrary, for the optical fibers in which the starting pipe had the thickness of 4 mm, 5 mm, 6 mm, 7 mm and 8 mm, the transmission loss is at or below the tolerance of 0.5 dB/km.

From the above results, it is found that the transmission loss of the optical fiber is suppressed below the tolerance by setting the thickness of the starting pipe to 4 mm to 8 mm.

SECOND EXAMPLE

A second example of the optical fiber manufacturing method and the optical fiber according to the invention will be described below.

Three kinds of optical fibers (A, B and C) are produced by changing the ratio S1/S2 of the cross-sectional area S1 of the glass rod 13 to the cross-sectional area S2 of the starting pipe 14. For these optical fibers, the transmission loss at a wavelength of 1.55 μm is measured and evaluated by comparison.

The method for manufacturing the optical fiber in the second example is roughly the same as in the first example, except that the cross-sectional area ratio S1/S2 is changed employing the glass rod 13 having a different outer diameter and the starting pipe 14 having different outer diameter and thickness.

In the optical fiber A, the glass rod in the preform had an outer diameter of 8.0 mm, and the starring rod had an outer diameter of 34.0 mm and a thickness of 6.5 mm. That is, the ratio S1/S2 of the cross-sectional area S1 of the glass rod to the cross-sectional area S2 of the starting pipe is 0.09. For this optical fiber A, the transmission loss at a wavelength of 1.55 μm is 0.31 dB/km.

In the optical fiber B, the glass rod in the preform had an outer diameter of 10.0 mm, and the starring rod had an outer diameter of 34.0 mm and a thickness of 4.0 mm. That is, the cross-sectional area ratio S1/S2 is 0.21. For this optical fiber B, the transmission loss at a wavelength of 1.55 μm is 0.30 dB/km.

In the optical fiber C, the glass rod in the preform had an outer diameter of 10.0 mm, and the starring rod had an outer diameter of 25.0 mm and a thickness of 5.0 mm. That is, the cross-sectional area ratio S1/S2 is 0.25. For this optical fiber C, the transmission loss at a wavelength of 1.55 μm is 0.30 dB/km.

From the above results, it is found that the transmission loss of the optical fiber is suppressed below the tolerance when the ratio S1/S2 of the cross-sectional area S1 of the glass rod to the cross-sectional area S2 of the starting pipe is from 0.03 to 0.30, because the transmission loss is within the tolerance of 0.5 dB/km.

Though the present invention is particularly shown and described in connection with the specific embodiments, it will be apparent to those skilled in the art that various changes and modifications in form and details may be made therein without departing from the spirit and scope of the invention.

This application is based on JP-A-2002-105263, filed on Apr. 8, 2002, its contents being fully incorporated herein.

[Industrial Applicability]

As described above, with the optical fiber manufacturing method and the optical fiber according to the invention, when the thickness of the starting pipe is set in a range from 4 mm to 8 mm, hydroxyl group entering on the surface of the starting glass is effectively prevented from getting near the core portion, and an increase in the transmission loss due to hydroxyl group is suppressed.

Further, when the cross-sectional area ratio of the glass rod to the starting pipe is set in a range from 0.03 to 0.30, hydroxyl group entering on the surface of the starting glass is effectively prevented from getting near the core portion, and an increase in the transmission loss due to hydroxyl group is suppressed.

The invention claimed is:

1. A method for manufacturing an optical fiber comprising the steps of:
   forming a glass pipe by coating a glass layer on the inner face of a starting pipe as a starting material;
   inserting a glass rod that becomes a central core portion and a part of a clad portion into the inside of the glass pipe;
   integrating the glass pipe and the glass rod by collapse to form a glass body;
   forming a preform by providing a jacket portion outside the glass body; and
   drawing the preform, wherein
   the thickness of the starting pipe is set in a range from 4 mm to 8 mm; and
   at least a portion of said glass layer has a refractive index different from a refractive index of said starting pipe.

2. A method for manufacturing an optical fiber comprising the steps of:
   forming a glass pipe by coating a glass layer on the inner face of a starting pipe as a starting material;
   inserting a glass rod that becomes a central core portion and a part of a clad portion into the inside of the glass pipe;
   integrating the glass pipe and the glass rod by collapse to form a glass body;
   forming a preform by providing a jacket portion outside the glass body; and
   drawing the preform, wherein
   the ratio S1/S2 of the cross-sectional area S1 of the glass rod to the cross-sectional area S2 of the starting pipe is set in a range from 0.03 to 0.30; and
   at least a portion of said glass layer has a refractive index different from a refractive index of said starting pipe.

3. The method for manufacturing the optical fiber according to claim 1 or 2, wherein
   the softening temperature of the jacket portion is lower than the softening temperature of pure silica.

4. The method for manufacturing the optical fiber according to claim 3, wherein
   the jacket portion is made of silica glass having chlorine with a concentration from 0.1 mol % to 1.0 mol % added.

5. The method for manufacturing the optical fiber according to claim 3, wherein
   the jacket portion is made of silica glass having fluorine with a concentration from 0.1 mol % to 1.0 mol % added.

6. The method for manufacturing the optical fiber according to claim 1 or 2, wherein
   the drawing tension at the time of drawing is from 60 gf to 350 gf.

7. The method for manufacturing the optical fiber according to claim 1 or 2, wherein
   the temperature of a heated portion of the preform at the time of drawing is from 1600° C. to 2200° C.

8. An optical fiber manufactured by the method for manufacturing the optical fiber according to claim 1 or 2.

9. The optical fiber according to claim 8, wherein
   the dispersion value at a wavelength of 1.55 μm is from (−200) ps/km/nm to (+4) ps/km/nm.

10. The optical fiber according to claim 8, wherein
    the dispersion value at a wavelength of 1.55 μm is from (−400) ps/km/nm to (+20) ps/km/nm.

11. The optical fiber according to claim 8, wherein
    the dispersion value at a wavelength of 1.55 μm is from (−500) ps/km/nm to (+20) ps/km/nm.

12. The optical fiber according to claim 8, wherein
    the dispersion slope at a wavelength of 1.55 μm is from (−2) ps/km/nm$^2$ to (+0.02) ps/km/nm$^2$.

13. The optical fiber according to claim 8, wherein
    the dispersion slope at a wavelength of 1.55 μm is from (−12) ps/km/nm$^2$ to (+0.05) ps/km/nm$^2$.

14. The optical fiber according to claim 8, wherein
    the dispersion slope at a wavelength of 1.55 μm is from (−15) ps/km/nm$^2$ to (+0.10) ps/km/nm$^2$.

15. The optical fiber according to claim 8, wherein
    the transmission loss at a wavelength of 1.55 μm is from 0.2 dB/km to 0.5 dB/km.

16. The optical fiber according to claim 8, wherein
    an increased amount of the transmission loss at a wavelength of 1.38 μm is less than or equal to 0.4 dB/km.

* * * * *